United States Patent
Yang et al.

(10) Patent No.: US 11,540,261 B2
(45) Date of Patent: *Dec. 27, 2022

(54) METHOD FOR INDICATING NUMBER OF TRANSMITTING PORTS OF UE, UE AND NETWORK DEVICE

(71) Applicant: GUANGDONG OPPO MOBILE TELECOMMUNICATIONS CORP., LTD., Guangdong (CN)

(72) Inventors: Ning Yang, Guangdong (CN); Zhi Zhang, Guangdong (CN); Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/215,252

(22) Filed: Mar. 29, 2021

(65) Prior Publication Data

US 2021/0219285 A1 Jul. 15, 2021

Related U.S. Application Data

(63) Continuation of application No. 16/623,080, filed as application No. PCT/CN2017/103016 on Sep. 22, 2017, now Pat. No. 10,993,212.

(51) Int. Cl.
*H04B 7/06* (2006.01)
*H04W 72/04* (2009.01)
*H04W 72/08* (2009.01)

(52) U.S. Cl.
CPC ..... *H04W 72/0413* (2013.01); *H04W 72/048* (2013.01); *H04W 72/087* (2013.01)

(58) Field of Classification Search
CPC ...... H04B 7/06; H04B 7/0404; H04B 7/0691; H04L 5/001; H04W 72/0413;
(Continued)

(56) References Cited

U.S. PATENT DOCUMENTS 9,743,912 B2 * 8/2017 Fichtinger ............ A61N 5/1027
9,907,576 B2 * 3/2018 Mahajan ............ A61B 17/7032
(Continued)

FOREIGN PATENT DOCUMENTS

CN 102332945 A 1/2012
CN 103503326 A 1/2014
(Continued)

OTHER PUBLICATIONS

First Office Action of the European application No. 17925722.5, dated Oct. 19, 2021.
(Continued)

*Primary Examiner* — Nathan S Taylor

(57) ABSTRACT

A method for indicating the number of transmitting ports of User Equipment (UE), a network device, UE and a computer storage medium are provided. The method includes that: if performance degradation exists for a present Band Combination (BC), whether the performance degradation exists for a present frequency and bandwidth combination or not is determined to obtain a determination result; and it is determined based on the determination result to indicate a network side that the UE uses a first number or second number of transmitting ports, the first number is smaller than the second number.

18 Claims, 2 Drawing Sheets

(58) Field of Classification Search
CPC ............. H04W 72/0453; H04W 76/15; H04W 72/048; H04W 72/087; H04W 8/24
See application file for complete search history.

(56) References Cited

U.S. PATENT DOCUMENTS

| | | | | |
|---|---|---|---|---|
| 10,404,314 | B2* | 9/2019 | Lim | H04L 27/0006 |
| 2010/0150563 | A1* | 6/2010 | Nakajima | H04J 14/0221 398/81 |
| 2012/0281556 | A1* | 11/2012 | Sayana | H04L 5/0057 370/252 |
| 2014/0329475 | A1* | 11/2014 | Ella | H04L 5/14 455/77 |
| 2015/0051998 | A1* | 2/2015 | Gire | G06F 3/0484 705/26.5 |
| 2015/0341863 | A1* | 11/2015 | Zhang | H04W 8/22 370/311 |
| 2016/0139271 | A1* | 5/2016 | Chamseddine | G01S 19/22 342/357.51 |
| 2016/0198452 | A1* | 7/2016 | Takahashi | H04W 28/18 370/329 |
| 2017/0006621 | A1* | 1/2017 | Jung | H04W 76/14 |
| 2017/0048647 | A1* | 2/2017 | Jung | H04W 4/70 |
| 2017/0223708 | A1* | 8/2017 | Jung | H04W 72/042 |
| 2017/0245243 | A1* | 8/2017 | Siomina | H04W 72/0453 |
| 2018/0049202 | A1* | 2/2018 | Lim | H04L 23/00 |
| 2018/0278283 | A1* | 9/2018 | Lim | H03H 1/00 |
| 2018/0343697 | A1* | 11/2018 | Hsu | H04W 76/16 |
| 2019/0141578 | A1* | 5/2019 | Tang | H04W 48/10 |
| 2019/0150012 | A1* | 5/2019 | Tang | H04W 72/08 370/252 |
| 2019/0150107 | A1* | 5/2019 | Tang | F01D 11/02 370/329 |
| 2019/0230663 | A1* | 7/2019 | Lim | H04L 5/001 |
| 2019/0281645 | A1* | 9/2019 | Van Der Velde | H04W 8/24 |
| 2019/0356369 | A1* | 11/2019 | Tang | H04B 7/0413 |

FOREIGN PATENT DOCUMENTS

| | | |
|---|---|---|
| CN | 103974340 A | 8/2014 |
| CN | 105119640 A | 12/2015 |
| WO | 2014117521 A1 | 8/2014 |

OTHER PUBLICATIONS

International Search Report in the international application No. PCT/CN2017/103016, dated May 30, 2018.
Written Opinion of the International Search Authority in the international application No. PCT/CN2017/103016, dated May 30, 2018.
Apple: "Single UL transmission support for NR NSA mode UEs" 3GPP Draft; RP-171858, 3rd Generation Partnership Project (3GPP), Mobile Competence Centre; 650, Route Des Lucioles; F-06921 Sophia-Antipolis Cedex France vol. TSG RAN, No. Sapporo, Japan; Sep. 11, 2017-Sep. 14, 2017 Sep. 10, 2017 (Sep. 10, 2017), XP051324424 [ retrieved on Sep. 10, 2017] the whole document *.
AT&T: "Supporting 2Tx UE and Single UL Transmission in NR", 3GPP Draft; RP-172020, 3rd Generation Partnership Project (3GPP), Mobile Competence Centre ; 650, Route Des Lucioles; F-06921 Sophia-Antipolis Cedex; France, vol. TSG RAN, No. Sapporo, Japan; Sep. 11, 2017-Sep. 14, 2017 Sep. 11, 2017 (Sep. 11, 2017), XP051669239 [ retrieved on Sep. 11, 2017 ] the whole document *.
Guangdong Oppo Mobile Telecom: "Discussion on the NR-LTE self-interference issue", 3GPP Draft; R1-1713294, 3rd Generation Partnership Project (3GPP), Mobile Competence Centre ; 650, Route Des Lucioles; F-06921 Sophia-Antipolis Cedex France vol. RAN WG1, No. Prague, Czech Republic; Aug, 21, 2017-Aug. 25, 2017 Aug. 20, 2017 (Aug. 20, 2017), XP051316101 [ retrieved on Aug. 20, 2017] the whole document *.
Apple Inc: "On UE TDM uplink transmission in NR NSA mode", 3GPP Draft; R1-1714089 on UE TDM Uplink Transmission in NR NSA Mode, 3rd Generation Partnership Project (3GPP), Mobile Competence Centre; 650, Route Des Lucioles; F-06921 Sophia-Antipolis Cedex; FR vol. RAN WG1, No. Prague, Czech Republic; Aug. 21, 2017-Aug. 25, 2017 Aug. 20, 2017 (Aug. 20, 2017), XP051316879, [ retrieved on Aug. 20, 2017]* the whole document *.
Supplementary European Search Report in the European application No. 17925722.5, dated Mar. 30, 2020.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.0.0 (Jun. 2015), http://www.3gpp.org.
First Office Action of the Indian application No. 201917054056, dated Feb. 26, 2021.
First Office Action of the U.S. Appl. No. 16/623,080, dated May 29, 2020.
Final Office Action of the U.S. Appl. No. 16/623,080, dated Sep. 11, 2020.
Notice of Allowance of the U.S. Appl. No. 16/623,080, dated Dec. 28, 2020.
Advisory Action of the U.S. Appl. No. 16/623,080, dated Nov. 12, 2020.

* cited by examiner

METHOD FOR INDICATING NUMBER OF TRANSMITTING PORTS OF UE, UE AND NETWORK DEVICE

CROSS-REFERENCE TO RELATED APPLICATION

The application is a continuation application of U.S. patent application Ser. No. 16/623,080 filed on Dec. 16, 2019, which is a continuation application of PCT Application No. PCT/CN2017/103016 filed on Sep. 22, 2017. The disclosures of both applications are incorporated by reference herein in their entireties.

TECHNICAL FIELD

The disclosure relates to the field of information processing, and particularly to a method for indicating the number of transmitting ports of User Equipment (UE), UE, a network device and a computer storage medium.

BACKGROUND

At present, along with pursuit of people for rate, delay, high-speed mobility and efficiency, and diversification and complication of services in the future life, the international standard organization 3rd Generation Partnership Project (3GPP) has started researching and developing the 5th-Generation (5G) technology. During early deployment of New Radio (NR), it is difficult to implement complete NR coverage, and thus typically, wide area Long Term Evolution (LTE) coverage and an NR island coverage mode are applied for network coverage. Moreover, LTE is mostly deployed below 6 GHz, leaving few spectrums for 5G below 6 GHz, so researches on application of spectrums above 6 GHz for NR are required. However, the high band is limited in coverage and fast in signal fading. Meanwhile, for protecting early LTE investment of mobile operating companies, a working mode of tight interworking between LTE and NR is proposed.

The radio frequency part of UEs, for example, mobile phones, is designed according to bands. However, for some Band Combinations (BCs), the number of antennae available for a UE is variable, namely, may be 1 or 2. If antenna usage conditions and resource allocation conditions at the network side and the UE side are mismatched, it may incur a problem about communication performance.

SUMMARY

For solving the technical problem, embodiments of the disclosure provide a method for indicating the number of transmitting ports of UE, UE, a network device and a computer storage medium.

The embodiments of the disclosure provide a method for indicating the number of transmitting ports of UE, which may be applied to the UE and include the following operations.

When the performance degradation exists for a present BC, whether performance degradation exists for a present frequency and bandwidth combination is determined to obtain a determination result.

It is determined to indicate a network side that the UE uses a first number or second number of transmitting ports based on the determination result, the first number is smaller than the second number.

The embodiments of the disclosure provide a method for indicating the number of transmitting ports of UE, which may be applied to a network device and include the following operation.

An indication sent by the UE is acquired when performance degradation exists for a present BC and it is determined that the UE uses a first or second number of transmitting ports according to the indication, the first number is smaller than the second number.

The embodiments of the disclosure provide a UE, which may include a first processing unit and a first communication unit.

The first processing unit may be configured to determine whether performance degradation exists for a present frequency and bandwidth combination when the performance degradation exists for a present BC, to obtain a determination result and determine, based on the determination result, to indicate a network side that the UE uses a first number or second number of transmitting ports, the first number is smaller than the second number.

The first communication unit may be configured to send an indication to the network side.

The embodiments of the disclosure provide a network device, which may include a second processing unit and a second communication unit.

The second processing unit may be configured to acquire an indication sent by a UE when performance degradation exists for a present BC and determine according to the indication, that the UE uses a first or second number of transmitting ports, the first number is smaller than the second number.

The second communication unit may be configured to receive the indication sent by the UE.

The embodiments of the disclosure provide a network device, which may include a processor and a memory configured to store a computer program capable of running in the processor.

The processor may be configured to run the computer program to execute the steps of the abovementioned method.

The embodiments of the disclosure provide UE, which may include a processor and a memory configured to store a computer program capable of running in the processor.

The processor may be configured to run the computer program to execute the steps of the abovementioned method.

The embodiments of the disclosure provide a computer storage medium having stored thereon computer-executable instructions, which when being executed, implement the steps of the abovementioned methods.

According to the technical solutions of the embodiments of the disclosure, it may be determined, in combination with the performance of the UE for a BC and a frequency and bandwidth combination, to indicate a network side that a first number or second number of transmitting ports is used for communication in a present environment. In such a manner, the network side may acquire performance of the UE in the present environment and then may determine a resource to be allocated to the UE based on the communication performance, so that the communication performance of the UE is ensured.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

First Embodiment

Figure 1:
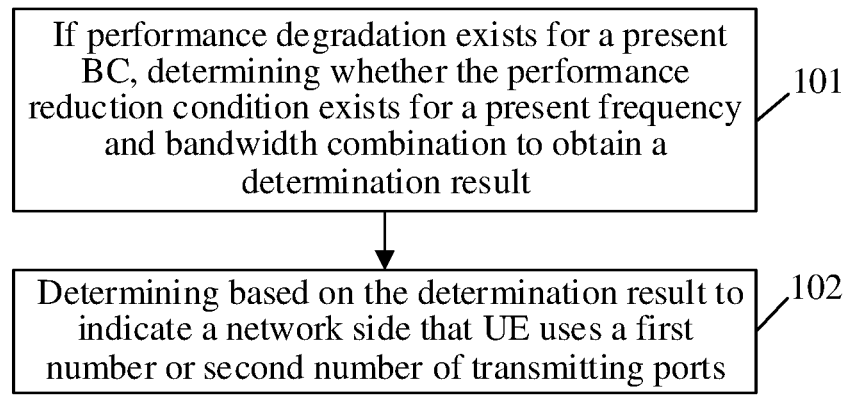
FIG. 1 is a flowchart of a method for indicating the number of transmitting ports of UE according to an embodiment of the disclosure.

An embodiment of the disclosure provides a method for indicating the number of transmitting ports of UE, which is applied to the UE and, as shown in FIG. 1, includes the following steps.

In 101, whether performance degradation exists for a present frequency and bandwidth combination is determined when the performance degradation exists for a present BC, to obtain a determination result.

In 102, it is determined, based on the determination result, to indicate a network side that the UE uses a first number or second number of transmitting ports, the first number is smaller than the second number.

Here, the second number may be the number of all transmitting ports (Tx) of the UE and may usually be, for example, 2. The first number may be a positive integer smaller than the second number and may be, for example, 1.

The BC may be a combination of bands of different systems. That is, each combination may usually include at least two bands. For example, the BC may include a band of an LTE system and a band of an NR system. Moreover, at least one of bands in each one BC is different from at least one of bands in any one of other BCs. That is, if a BC 1 includes an LTE band 1 and an NR band 1, a BC 2 may include the LTE band 1 and an NR band 2, and a BC 3 may include an LTE band 3 and an NR band 3.

Whether the performance degradation exists for the present BC may be preset by a UE side or summarized by the UE side in a long-term using process, which is not limited in the embodiment.

In addition, in the BC for which the performance degradation exists, the UE, when communicating in a certain region (for example, a certain cell), usually only adopts a channel or frequency corresponding to the cell for communication. In such case, the performance degradation does not exist for communication in the frequency and a bandwidth corresponding to the frequency, and then a maximum number of transmitting ports may be adopted for communication.

The steps will be described below based on different examples in detail respectively.

First Example

Before 101 is executed, the UE, after entering a connected state, sends a wireless capability to the network side.

The wireless capability includes performance degradation indication information of the UE for at least one BC, each BC includes at least two bands, and the performance degradation indication information indicates whether the performance degradation exists for the at least one BC.

Or, the wireless capability includes a number of the transmitting ports used by the UE for at least one BC, and each BC includes at least two bands.

The performance degradation of the UE may be, for example, performance degradation caused by the problem of Intermodulation Distortion (IMD).

That is, when the UE is in a dual connectivity scenario, a BC of two systems may cause performance degradation of the UE. Therefore, a performance degradation indication of the UE for each BC in an Evolved Universal Terrestrial Radio Access (E-UTRA) NR Dual Connectivity (EN-DC) scenario is notified to the network side through the wireless capability. If a performance degradation problem exists, the indication is true and 1Tx is used as a default, otherwise the indication is not reported.

Or, it is directly indicated that 1Tx is used for some BCs.

In addition, after the wireless capability is reported to the network side, the network side correspondingly forwards all capability information to a Core Network (CN) for storage. When the UE enters the connected state again, the network side may directly acquire the wireless capability information of the UE from a CN side without reporting by the UE.

The hypothesis is that the UE has reported the wireless capability information of the UE to the network side and the wireless capability information has been stored in the CN. The UE acquires frequency and bandwidth information of a cell in the cell.

In addition, after the UE acquires EN-DC configuration information, frequency and bandwidth information of another cell in the EN-DC scenario is acquired.

Based on this, the network may inquire the UE about 2Tx capability information of channel allocation for a certain BC. That is, before 101 is executed, the method may further include the following operations. Responsive to determining that the performance degradation exists for the present BC of the UE and determining a frequency and bandwidth corresponding to a cell where the UE is located, the network side may actively initiate a query to the UE to acquire whether the performance degradation for the UE also exists for the frequency and bandwidth combination.

Correspondingly, the UE, when receiving the query, executes 101.

It may be understood that receiving the query from the network side may be an implementation and there may be another implementation. For example, the UE may learn the frequency and bandwidth of the cell where it is located and then actively execute the operation of determining whether the performance degradation exists for the present frequency and bandwidth combination when the performance degradation exists for the present BC, to obtain the determination result.

Furthermore, the operation in 102 that it is determined based on the determination result to indicate the network side that the UE uses the first number or second number of transmitting ports further includes the following operation.

If the determination result indicates that no performance degradation exists for the present frequency and bandwidth combination, it is determined to indicate the network side that the UE uses the second number of transmitting ports.

That is, if the performance degradation problem exists for the presently configured BC, the UE further determines whether the performance degradation problem also exists for the present frequency and bandwidth combination. If NO, the UE indicates support of 2Tx in a Radio Resource Control (RRC) connection reconfiguration complete message. Otherwise no indication is made.

Through the above description, it may be understood that the UE, once a wireless environment changes, may determine whether the performance degradation exists for a BC and a frequency and bandwidth combination in an environment where the UE is located. For example, When the UE has determined the number of transmitting ports used in a previous cell, if an EN-DC configuration changes or an environment changes (for example, getting close to a center of the cell) as the UE moves, the UE determines whether the performance degradation problem exists for the presently configured BC, if YES, the UE further determines whether the performance degradation problem also exists for the present frequency and bandwidth combination, and if NO, support of 2Tx is indicated in a response message.

Finally, it is to be noted that, in the example, when the UE reports the number of the supported transmitting ports (Tx) to the network side through a Secondary Cell Group (SCG) Signaling Radio Bearer (SRB), a base station of an SCG may send the number to a base station side where a master cell group of the UE is located, namely a Slave Node (SN) forwards the number of Tx to a Master Node (MN) through Xn.

Second Example

Before 101 is executed, the method may further include the following operations. Configuration information is received from the network side. The configuration information includes at least one of: a BC, or a frequency and bandwidth combination.

It is determined based on the configuration information that the first number or second number of transmitting ports is supported for at least one of: the BC, or the frequency and bandwidth combination.

That is, the network transmits a probable BC or channel allocation configuration. That is, the network side may transmit BC information and frequency and bandwidth combination information corresponding to all cells managed by it.

The UE may identify the combinations for which only the first number 1Tx is supported and the combinations for which the second number 2Tx is certainly supported through capability based on a received list. In such case, feedback information identifying the first number and the second number may be sent to the network side.

Furthermore, the UE may send preference to identify some bands for which the performance degradation exist but 2Tx may also be supported, and adopted signaling may be assistance information of the UE.

Moreover, if the environment changes (for example, the UE moves), the UE may send preference to identify some bands for which the performance degradation exist but 2Tx may also be supported, and adopted signaling may be the assistance information of the UE.

Like the first example, the preference identifier of the UE may be sent after the network inquires the UE about whether 2Tx may be supported and, of course, may also be sent to the network side after the UE detects the change by itself.

Third Example

The method further includes the following operations. Hardware capability information is sent to the network side, the hardware capability information indicates whether the UE may support the second number of transmitting ports. A hardware capability is a 2Tx support capability.

The operation that it is determined, based on the determination result, to indicate the network side that the UE uses the first number or second number of transmitting ports includes the following operations.

When the hardware capability information indicates that the UE supports the second number of the transmitting ports, if the determination result indicates that the performance degradation exists for the present frequency and bandwidth combination, it is determined to indicate the network side that the UE uses the first number of transmitting ports, otherwise it is determined not to indicate the network side about the number of the transmitting ports used by the UE.

A reporting manner may be that the UE reports whether 2Tx may be supported, for example, only 1Tx may be supported, in the present environment through dynamic RRC signaling, for example, the UE assistance information.

If the UE reports, the network makes a configuration or regulates resource allocation according to 1Tx. If the UE does not report, the network makes the configuration according to 2Tx.

Fourth Example

The example is based on the scenario that the wireless capability is sent to the network side in the first example.

The method further includes the following operations.

After the wireless capability is sent to the network side, it is determined whether query information about at least one frequency and bandwidth combination is received from the network side.

If the query information about the at least one frequency and bandwidth combination is received from the network side, information that the first or second number of transmitting ports is supported for the at least one frequency and bandwidth combination is sent to the network side.

The UE sends a report about a BC-based capability at first. The network, after receiving the report from the UE, may further indicate whether the UE is required to report a channel-granularity-based capability of one or some BCs.

It may be seen that, with adoption of the solution, it may be determined, in combination with the performance of the UE for a BC and a frequency and bandwidth combination, to indicate a network side that a first number or second number of transmitting ports is used for communication in a present environment. In such a manner, the network side may acquire performance of the UE in the present environment and then may determine a resource to be allocated to the UE based on the communication performance, so that the communication performance of the UE is ensured.

Second Embodiment

An embodiment of the disclosure provides a method for indicating the number of transmitting ports of UE, which is applied to a network device and includes the following operations. If performance degradation exists for a present BC, an indication sent by the UE is acquired, and it is determined, according to the indication, that the UE uses a first or second number of transmitting ports, the first number is smaller than the second number.

Here, the network device may be a base station managing the UE and, when the UE may be connected with two networks, for example, connected with a master cell group and an SCG, the network device may be a base station in one of the two networks. Moreover, the master cell group and the SCG may be an LTE cell and an NR cell respectively. In an embodiment, the network device may be the base station in the master cell group (i.e., the LTE cell).

The second number may be the number of all transmitting ports (Tx) of the UE and may usually be, for example, 2. The first number may be a positive integer smaller than the second number and may be, for example, 1.

The BC may be a combination of bands of different systems. That is, each combination may usually include at least two bands. For example, the BC may include a band of an LTE system and a band of an NR system. Moreover, at least one of bands in each one BC is different from at least one of bands in any one of other BCs. That is, if a BC 1 includes an LTE band 1 and an NR band 1, a BC 2 may include the LTE band 1 and an NR band 2, and a BC 3 may include an LTE band 3 and an NR band 3.

Whether the performance degradation exists for the present BC may be preset by a UE side or summarized by the UE side in a long-term using process, which are not limited in the embodiment.

In addition, in the BC for which the performance degradation exists, the UE, when communicating in a certain region (for example, a certain cell), usually only adopts a channel or frequency corresponding to the cell for communication. In such case, if no performance degradation exists for communication in the frequency and a bandwidth corresponding to the frequency, a maximum number of transmitting ports may be adopted for communication.

The operations will be described below based on different examples in detail respectively.

First Example

It is determined whether a wireless capability corresponding to the UE is stored on a CN side after the UE enters a connected state, and if NO, request information for acquiring the wireless capability is sent to the UE.

The wireless capability includes performance degradation indication information of the UE for at least one BC, each BC includes at least two bands, and the performance degradation indication information indicates whether the performance degradation exists for the at least one BC.

Or, the wireless capability includes a number of the transmitting ports used by the UE for each of at least one BC, and each BC includes at least two bands.

The performance degradation of the UE may be, for example, performance degradation caused by the problem of IMD.

That is, when the UE is in a dual connectivity scenario, a BC of two systems may cause performance degradation of the UE. Therefore, a performance degradation indication of the UE for each BC in an EN-DC scenario is notified to the network side through the wireless capability. If a performance degradation problem exists, the indication is true and 1Tx is used as a default, otherwise the indication is not reported.

Or, it is directly indicated that 1Tx is used for some BCs.

In addition, after the wireless capability is reported to the network side, the network side correspondingly forwards all capability information to a CN for storage. When the UE enters the connected state again, the network side may directly acquire the wireless capability information of the UE from the CN side without reporting by the UE.

The hypothesis is that the UE has reported the wireless capability information of the UE to the network side and the wireless capability information has been stored in the CN. The UE acquires frequency and bandwidth information of a cell in the cell.

In addition, after the UE acquires EN-DC configuration information, frequency and bandwidth information of another cell in the EN-DC scenario is acquired.

Based on this, the network may inquire the UE about 2Tx capability information of channel allocation for a certain BC. That is, responsive to determining that the performance degradation exists for the present BC of the UE and determining a frequency and bandwidth corresponding to a cell where the UE is located, the network side may actively initiate a query to the UE to acquire whether the performance degradation of the UE also exists for the frequency and bandwidth combination.

It may be understood that receiving the query of the network side may be an implementation and there may be another implementation. For example, the UE may learn the frequency and bandwidth of the cell where it is located and then actively execute the operation of determining, if the performance degradation exists for the present BC, whether the performance degradation exists for the present frequency and bandwidth combination to obtain the determination result.

Furthermore, if an indication received from the UE indicates that the second number of transmitting ports is used, it is determined that no performance degradation exists for the present frequency and bandwidth combination corresponding to the UE.

That is, if the performance degradation problem exists for the presently configured BC, the UE further determines whether the performance degradation problem also exists for the present frequency and bandwidth combination. If NO, the UE indicates support of 2Tx in an RRC connection reconfiguration complete message. Otherwise no indication is made.

Through the above description, it may be understood that the UE, once a wireless environment changes, may determine whether the performance degradation exists for a BC and a frequency and bandwidth combination in an environment where the UE is located. For example, When the UE has determined the number of transmitting ports used in a previous cell, if an EN-DC configuration changes or an environment changes (for example, getting close to a center of the cell) as the UE moves, the UE determines whether the performance degradation problem exists for the presently configured BC, if YES, the UE further determines whether the performance degradation problem also exists for the present frequency and bandwidth combination, and if NO, support of 2Tx is indicated in a response message.

Finally, it is to be noted that, in the example, when the UE sends the indication to the network side through the SCG, the indication sent by the SCG is acquired through Xn. Specifically, when the UE reports the number of the supported transmitting ports (Tx) to the network side through an SCG SRB, a base station of the SCG may send the number to a base station side where a master cell group of the UE is located, namely an SN forwards the number of Tx to an MN through Xn.

Second Example

Configuration information is sent to the UE, the configuration information includes at least one of: a BC, or a frequency and bandwidth combination.

Correspondingly, the UE receives the configuration information sent by the network side, the configuration information includes at least one of the BC or the frequency and bandwidth combination and the UE determines based on the configuration information that the first number or second number of transmitting ports is supported for at least one of: the BC, or the frequency and bandwidth combination.

That is, the network transmits a probable BC or channel allocation configuration. That is, the network side may transmit BC information and frequency and bandwidth combination information corresponding to all cells managed by it.

The UE may identify the combinations for which only the first number 1Tx is supported and the combinations for which the second number 2Tx is certainly supported through capability based on a received list. In such case, feedback information identifying the first number and the second number may be sent to the network side.

Furthermore, the UE may send preference to identify some bands for which the performance degradation exist but 2Tx may also be supported, and adopted signaling may be UE assistance information.

Moreover, if the environment changes (for example, the UE moves), the UE may send preference to identify some bands for which the performance degradation exists but 2Tx may also be supported, and adopted signaling may be the assistance information of the UE.

Like the first example, the preference identifier of the UE may be sent after the network inquires the UE about whether 2Tx may be supported and, of course, may also be sent to the network side after the UE detects the change by itself.

Third Example

Hardware capability information sent by the UE is received, the hardware capability information indicates whether the UE may support the second number of transmitting ports. A hardware capability is a 2Tx support capability.

When an indication indicating the first number of transmitting ports is used is received from the UE, resource configuration is performed based on the first number of transmitting ports.

When no indication indicating that the first number of transmitting ports is used is received from the UE, resource configuration is performed based on the second number of transmitting ports.

A reporting manner may be that the UE reports whether 2Tx may be supported, for example, only 1Tx may be supported, in the present environment through dynamic RRC signaling, for example, the UE assistance information.

If the UE reports, the network makes a configuration or regulates resource allocation according to 1Tx. If the UE does not report, the network makes the configuration according to 2Tx.

Fourth Example

The example is based on the scenario that the wireless capability is sent to the network side in the first example.

After the wireless capability is received from the UE, query information about at least one frequency and bandwidth combination is sent to the UE.

Information that the first or second number of transmitting ports is supported for the at least one frequency and bandwidth combination is received from the UE.

That is, the UE sends a report about a BC-based capability at first. The network, after receiving the report from the UE, may further indicate whether the UE is required to report a channel-granularity-based capability of one or some BCs.

It may be seen that, with adoption of the solution, it may be determined, in combination with the performance of the UE for a BC and a frequency and bandwidth combination, to indicate a network side that a first number or second number of transmitting ports is used for communication in a present environment. In such a manner, the network side may acquire performance of the UE in the present environment and then may determine a resource to be allocated to the UE based on the communication performance, so that the communication performance of the UE is ensured.

Third Embodiment

Figure 2:
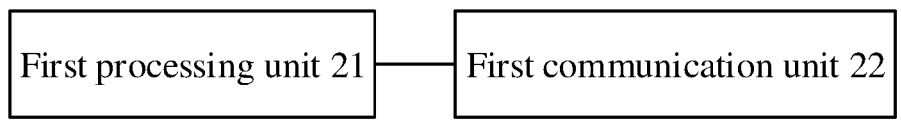
FIG. 2 is a block diagram of UE according to an embodiment of the disclosure.

An embodiment of the disclosure provides a UE, which, as shown in FIG. 2, includes a first processing unit 21 and a first communication unit 22.

The first processing unit 21 is configured to determine whether performance degradation exists for a present frequency and bandwidth combination when the performance degradation exists for a present BC, to obtain a determination result and determine, based on the determination result, to indicate a network side that the UE uses a first number or second number of transmitting ports, the first number is smaller than the second number.

The first communication unit 22 is configured to send an indication to the network side.

Here, the second number may be the number of all transmitting ports (Tx) of the UE and may usually be, for example, 2. The first number may be a positive integer smaller than the second number and may be, for example, 1.

The BC may be a combination of bands of different systems. That is, each combination may usually include at least two bands. For example, the BC may include a band of an LTE system and a band of an NR system. Moreover, at least one of bands in each one BC is different from at least one of bands in any one of other BCs. That is, if a BC 1 includes an LTE band 1 and an NR band 1, a BC 2 may include the LTE band 1 and an NR band 2, and a BC 3 may include an LTE band 3 and an NR band 3.

Whether the performance degradation exists for the present BC may be preset by a UE side or summarized by the UE side in a long-term using process, which is not limited in the embodiment.

In addition, in the BC for which the performance degradation exists, the UE, when communicating in a certain region (for example, a certain cell), usually only adopts a channel or frequency corresponding to the cell for communication. In such case, the performance degradation does not exist for communication in the frequency and a bandwidth corresponding to the frequency and then a maximum number of transmitting ports may be adopted for communication.

The steps will be described below based on different examples in detail respectively.

First Example

The first communication unit 22 is further configured to send a wireless capability to the network side after the UE enters a connected state.

The wireless capability includes performance degradation indication information of the UE for at least one BC, each BC includes at least two bands, and the performance degradation indication information indicates whether the performance degradation exists for the at least one BC.

Or, the wireless capability includes a number of the transmitting ports used by the UE for at least one BC, and each BC includes at least two bands.

The performance degradation of the UE may be, for example, performance degradation caused by the problem of IMD.

That is, when the UE is in a dual connectivity scenario, a BC of two systems may cause performance degradation of the UE, and then a performance degradation indication of the UE for each BC in an EN-DC scenario is notified to the network side through the wireless capability. If a performance degradation problem exists, the indication is true and 1Tx is used as a default, otherwise the indication is not reported.

Or, it is directly indicated that 1Tx is used for some BCs.

In addition, after the wireless capability is reported to the network side, the network side correspondingly forwards all capability information to a CN for storage. When the UE enters the connected state again, the network side may directly acquire the wireless capability information of the UE from a CN side without reporting by the UE.

The hypothesis is that the UE has reported the wireless capability information of the UE to the network side and the wireless capability information has been stored in the CN. The UE acquires frequency and bandwidth information of a cell in the cell.

In addition, after the UE acquires EN-DC configuration information, frequency and bandwidth information of another cell in the EN-DC scenario is acquired.

Based on this, the network may inquire the UE about 2Tx capability information of channel allocation for a certain BC. Responsive to determining that the performance degradation exists for the present BC of the UE and determining a frequency and bandwidth corresponding to a cell where the UE is located, the network side may actively initiate a query to the UE to acquire whether the performance degradation for the UE also exists for the frequency and bandwidth combination.

It may be understood that receiving the query from the network side may be an implementation and there may be another implementation. For example, the UE may learn the frequency and bandwidth of the cell where it is located and then actively execute the operation of determining, if the performance degradation exists for the present BC, whether the performance degradation exists for the present frequency and bandwidth combination to obtain the determination result.

Furthermore, the first processing unit 21 is further configured to determine to indicate the network side that the UE uses the second number of transmitting ports when the determination result indicates that no performance degradation exists for the present frequency and bandwidth combination.

That is, if the performance degradation problem exists for the presently configured BC, the UE further determines whether the performance degradation problem also exists for the present frequency and bandwidth combination. If NO, the UE indicates support of 2Tx in an RRC connection reconfiguration complete message. Otherwise no indication is made.

Through the above description, it may be understood that the UE, once a wireless environment changes, may determine whether the performance degradation exists for a BC and a frequency and bandwidth combination in an environment where the UE is located. For example, When the UE has determined the number of transmitting ports used in a previous cell, if an EN-DC configuration changes or an environment changes (for example, getting close to a center of the cell) as the UE moves, the UE determines whether the performance degradation problem exists for the presently configured BC, if YES, the UE further determines whether the performance degradation problem also exists for the present frequency and bandwidth combination, and if NO, support of 2Tx is indicated in a response message.

Finally, it is to be noted that, in the example, when the UE reports the number of the supported transmitting ports (Tx) to the network side through an SCG SRB, a base station of an SCG may send the number to a base station side where a master cell group of the UE is located, namely an SN forwards the number of Tx to an MN through Xn.

Second Example

The first communication unit 22 is further configured to receive configuration information sent by the network side, the configuration information includes at least one of: a BC, or a frequency and bandwidth combination.

Correspondingly, the first processing unit 21 is further configured to determine based on the configuration information that the first number or second number of transmitting ports is supported for at least one of: the BC, or the frequency and bandwidth combination.

That is, the network transmits a probable BC or channel allocation configuration. That is, the network side may transmit BC information and frequency and bandwidth combination information corresponding to all cells managed by it.

The UE may identify the combinations for which only the first number 1Tx is supported and the combinations for which the second number 2Tx is certainly supported through capability based on a received list. In such case, feedback information identifying the first number and the second number may be sent to the network side.

Furthermore, the UE may send preference to identify that some bands for which the performance degradation exist but 2Tx may also be supported, and adopted signaling may be the assistance information of the UE.

Moreover, if the environment changes (for example, the UE moves), the UE may send preference to identify some bands for which the performance degradation exist but 2Tx may also supported, and adopted signaling may be the assistance information of the UE.

Like the first example, the preference identifier of the UE may be sent after the network inquires the UE about whether 2Tx may be supported and, of course, may also be sent to the network side after the UE detects the change by itself.

Third Example

The first communication unit 22 is further configured to send hardware capability information to the network side. The hardware capability information indicates whether the UE supports the second number of transmitting ports. A hardware capability is a 2Tx support capability.

The first processing unit 21 is further configured to, when the hardware capability information indicates that the UE supports the second number of transmitting ports, determine to indicate the network side that the UE uses the first number of transmitting ports if the determination result indicates that the performance degradation exists for the present frequency and bandwidth combination, and determine not to indicate the network side about the number of the transmitting ports used by the UE, if the determination result indicates that no performance degradation exists for the present frequency and bandwidth combination.

A reporting manner may be that the UE reports whether 2Tx may be supported, for example, only 1Tx may be supported, in the present environment through dynamic RRC signaling, for example, the UE assistance information.

If the UE reports, the network makes a configuration or regulates resource allocation according to 1Tx. If the UE does not report, the network makes the configuration according to 2Tx.

Fourth Example

The example is based on the scenario that the wireless capability is sent to the network side in the first example.

The first processing unit 21 is further configured to determine whether query information about at least one frequency and bandwidth combination is received from the network side after the wireless capability is sent to the network side, and send, to the network side, information that the first or second number of transmitting ports is supported for the at least one frequency and bandwidth combination if the query information about the at least one frequency and bandwidth combination is received from the network side.

The UE sends a report about a BC-based capability at first. The network, after receiving the report from the UE, may further indicate whether the UE is required to report a channel-granularity-based capability of one or some BCs.

It may be seen that, with adoption of the solution, it may be determined, in combination with the performance of the UE for a BC and a frequency and bandwidth combination, to indicate a network side that a first number or second number of transmitting ports is used for communication in a present environment. In such a manner, the network side may acquire performance of the UE in the present environment and then may determine a resource to be allocated to the UE based on the communication performance, so that the communication performance of the UE is ensured.

Fourth Embodiment

Figure 3:
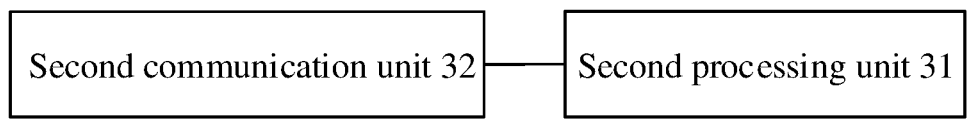
FIG. 3 is a block diagram of a network device according to an embodiment of the disclosure.

An embodiment of the disclosure provides a network device, which, as shown in FIG. 3, includes a second processing unit 31 and a second communication unit 32.

The second processing unit 31 is configured to, if performance degradation exists for a present BC, acquire an indication sent by a UE and determine, according to the indication, that the UE uses a first or second number of transmitting ports, the first number is smaller than the second number.

The second communication unit 32 is configured to receive the indication sent by the UE.

Here, the network device may be a base station managing the UE and, when the UE may be connected with two networks, for example, connected with a master cell group and an SCG, the network device may be a base station in one of the two networks. Moreover, the master cell group and the SCG may be an LTE cell and an NR cell respectively. In an embodiment, the network device may be the base station in the master cell group (i.e., the LTE cell).

The second number may be the number of all transmitting ports (Tx) of the UE and may usually be, for example, 2. The first number may be a positive integer smaller than the second number and may be, for example, 1.

The BC may be a combination of bands of different systems. That is, each combination may usually include at least two bands. For example, the BC may include a band of an LTE system and a band of an NR system. Moreover, at least one of bands in each one BC is different from at least one of bands in any one of other BCs. That is, if a BC 1 includes an LTE band 1 and an NR band 1, a BC 2 may include the LTE band 1 and an NR band 2, and a BC 3 may include an LTE band 3 and an NR band 3.

Whether the performance degradation exists for the present BC may be preset by a UE side or summarized by the UE side in a long-term using process, which are not limited in the embodiment.

In addition, in the BC for which the performance degradation exists, the UE, when communicating in a certain region (for example, a certain cell), usually only adopts a channel or frequency corresponding to the cell for communication. In such case, if no performance degradation exists for communication in the frequency and a bandwidth corresponding to the frequency, and then a maximum number of transmitting ports may be adopted for communication.

The steps will be described below based on different examples in detail respectively.

First Example

Whether a wireless capability corresponding to the UE is stored on a CN side is determined after the UE enters a connected state, and if NO, request information for acquiring the wireless capability is sent to the UE.

The wireless capability includes performance degradation indication information of the UE for at least one BC, each BC includes at least two bands, and the performance degradation indication information indicates whether the performance degradation exists for the at least one BC.

Or, the wireless capability includes a number of the transmitting ports used by the UE for at least one BC, and each BC includes at least two bands.

The performance degradation of the UE may be, for example, performance degradation caused by the problem of IMD.

That is, when the UE is in a dual connectivity scenario, a BC of two systems may cause performance degradation of the UE Therefore, a performance degradation indication of the UE for each BC in an EN-DC scenario is notified to the network side through the wireless capability. If a performance degradation problem exists, the indication is true and 1Tx is used as a default, otherwise the indication is not reported.

Or, it is directly indicated that 1Tx is used for some BCs.

In addition, after the wireless capability is reported to the network side, the network side correspondingly forwards all capability information to a CN for storage. When the UE enters the connected state again, the network side may directly acquire the wireless capability information of the UE from a CN side without reporting by the UE.

The hypothesis is that the UE has reported the wireless capability information of the UE to the network side and the wireless capability information has been stored in the CN. The UE acquires frequency and bandwidth information of a cell in the cell.

In addition, after the UE acquires EN-DC configuration information, frequency and bandwidth information of another cell in the EN-DC scenario is acquired.

Based on this, the network may inquire the UE about 2Tx capability information of channel allocation for a certain BC. That is, responsive to determining that the performance degradation exists for the present BC of the UE and determining a frequency and bandwidth corresponding to a cell where the UE is located, the network side may actively initiate a query to the UE to acquire whether the performance degradation of the UE also exists for the frequency and bandwidth combination.

It may be understood that receiving the query of the network side may be an implementation and there may be another implementation. For example, the UE may learn the frequency and bandwidth of the cell where it is located and then actively execute the operation of determining, if the performance degradation exists for the present BC, whether the performance degradation exists for the present frequency and bandwidth combination to obtain the determination result.

Furthermore, if the received indication indicates that the indication indicates that the UE uses the second number of transmitting ports, it is determined that no performance degradation exists for a present frequency and bandwidth combination corresponding to the UE.

That is, if the performance degradation problem exists for the presently configured BC, the UE further determines whether the performance degradation problem also exists for the present frequency and bandwidth combination. If NO, the UE indicates support of 2Tx in an RRC connection reconfiguration complete message. Otherwise no indication is made.

Through the above description, it may be understood that the UE, once a wireless environment changes, may determine whether the performance degradation exists for a BC and a frequency and bandwidth combination in an environment where the UE is located. For example, When the UE has determined the number of transmitting ports used in a previous cell, if an EN-DC configuration changes or an environment changes (for example, getting close to a center of the cell) as the UE moves, the UE determines whether the performance degradation problem exists for the presently configured BC, if YES, the UE further determines whether the performance degradation problem also exists for the present frequency and bandwidth combination, and if NO, support of 2Tx is indicated in a response message.

Finally, it is to be noted that, in the example, when the UE sends the indication to the network side through the SCG, the indication sent by the SCG is acquired through Xn. For the second communication unit, when the UE reports the number of the supported transmitting ports (Tx) to the network side through an SCG SRB, a base station of the SCG may send the number to a base station side where a master cell group of the UE is located, namely an SN forwards the number of Tx to an MN through Xn.

Second Example

The second communication unit 22 is further configured to send configuration information to the UE, the configuration information includes at least one of: a BC, or a frequency and bandwidth combination.

Correspondingly, the UE receives the configuration information sent by the network side, the configuration information includes at least one of the BC or the frequency and bandwidth combination and the UE determines based on the configuration information whether the first or second number of the transmitting ports supported for at least one of: the BC, or the frequency and bandwidth combination.

That is, the network transmits a probable BC or channel allocation configuration. That is, the network side may transmit BC information and frequency and bandwidth combination information corresponding to all cells managed by it.

The UE may identify the combinations for which only the first number 1Tx is supported and the combinations for which the second number 2Tx is certainly supported through capability based on a received list. In such case, feedback information identifying the first number and the second number may be sent to the network side.

Furthermore, the UE may send preference to identify some bands for which the performance degradation exist but 2Tx may also be supported, and adopted signaling may be UE assistance information.

Moreover, if the environment changes (for example, the UE moves), the UE may send preference to identify that some bands for which the performance degradation exist but 2Tx may also be supported, and adopted signaling may be the assistance information of the UE.

Like the first example, the preference identifier of the UE may be sent after the network inquires the UE about whether 2Tx may be supported and, of course, may also be sent to the network side after the UE detects the change by itself.

Third Example

The second communication unit is further configured to receive hardware capability information sent by the UE, the hardware capability information indicates whether the UE may support the second number of transmitting ports. A hardware capability is a 2Tx support capability.

The second processing unit is further configured to perform resource configuration based on the first number of transmitting ports, when an indication indicating that the first number of transmitting ports is used is received from the UE, and perform resource configuration based on the second number of transmitting ports when no indication indicating that the first number of transmitting ports is used is received from the UE.

A reporting manner may be that the UE reports whether 2Tx may be supported, for example, only 1Tx may be supported, in the present environment through dynamic RRC signaling, for example, the UE assistance information.

If the UE reports, the network makes a configuration or regulates resource allocation according to 1Tx. If the UE does not report, the network makes the configuration according to 2Tx.

Fourth Example

The example is based on the scenario that the wireless capability is sent to the network side in the first example.

After the wireless capability sent by the UE is received, query information about at least one frequency and bandwidth combination is sent to the UE.

Information that the first or second number of the transmitting ports is supported for the at least one frequency and bandwidth combination is received from the UE.

That is, the UE sends a report about a BC-based capability at first. The network, after receiving the report from the UE, may further indicate whether the UE is required to report a channel-granularity-based capability of one or some BCs.

It may be seen that, with adoption of the solution, it may be determined, in combination with the performance of the UE for a BC and a frequency and bandwidth combination, to indicate a network side that a first number or second number of transmitting ports is used for communication in a present environment. In such a manner, the network side may acquire performance of the UE in the present environment and then may determine a resource to be allocated to the UE based on the communication performance, so that the communication performance of the UE is ensured.

Figure 4:
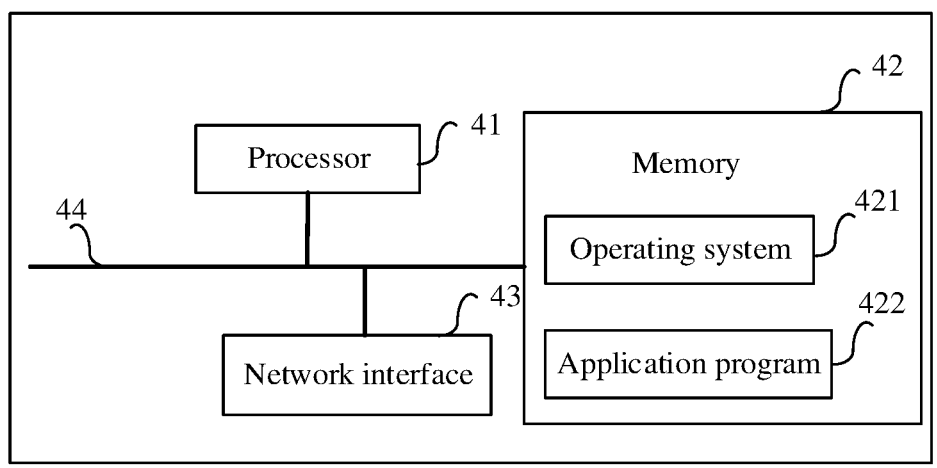
FIG. 4 is a schematic diagram of a hardware architecture according to an embodiment of the disclosure.

An embodiment of the disclosure also provides a hardware composition architecture of a network device or UE, which, as shown in FIG. 4, includes at least one processor 41, a memory 42 and at least one network interface 43. Each component is coupled together through a bus system 44. It may be understood that the bus system 44 is configured to implement connection communication between these components. Besides a data bus, the bus system 44 includes a power bus, a control bus and a state signal bus. However, for clear description, various buses in FIG. 4 are marked as the bus system 44.

It may be understood that the memory 42 in the embodiment of the disclosure may be a volatile memory or a nonvolatile memory, or may include both the volatile and nonvolatile memories.

In some implementations, the memory 42 stores the following elements, executable modules or data structures, or a subset thereof or an extended set thereof: an operating system 421 and an application program 422.

Herein, the processor 41 is configured to be capable of processing the steps of the method in the first or second embodiment, which will not be elaborated herein.

An embodiment of the disclosure provides a computer storage medium having stored thereon computer-executable instructions which when being executed, can implement the steps of the method in the first or second embodiment.

When being implemented in form of software functional module and sold or used as an independent product, the device of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium having stored thereon computer programs, the computer program being configured to execute the data scheduling method of the embodiments of the disclosure.

Although the embodiments of the disclosure have been disclosed for the exemplary purposes, those skilled in the art may realize that it is also possible to make various improvements, additions and replacements. Therefore, the scope of the disclosure should not be limited to the abovementioned embodiments.

The invention claimed is:

1. A method for indicating a number of transmitting ports of a User Equipment (UE), performed by the UE and comprising:

determining whether performance degradation exists for a present frequency and bandwidth combination when the performance degradation exists for a present Band Combination (BC), to obtain a determination result, wherein the present BC is for systems, and the present frequency and bandwidth combination is for cells; and determining to indicate a network side that the UE uses a first or second number of transmitting ports based on the determination result, the first number being smaller than the second number, wherein determining to indicate the network side that the UE uses the first or second number of transmitting ports based on the determination result comprises:

determining to indicate the network side that the UE uses the second number of transmitting ports when the determination result indicates that no performance degradation exists for the present frequency and bandwidth combination.

2. The method of claim 1, further comprising:

sending a wireless capability to the network side after the UE enters a connected state.

3. The method of claim 2, wherein the wireless capability comprises performance degradation indication information of the UE for at least one BC, each BC comprises at least two bands, and the performance degradation indication information indicates whether the performance degradation exists for the at least one BC.

4. The method of claim 2, wherein the wireless capability comprises a number of transmitting ports used by the UE for each of at least one BC, and each BC comprises at least two bands.

5. The method of claim 2, further comprising:

after the wireless capability is sent to the network side, determining whether query information about at least one frequency and bandwidth combination is received from the network side; and if the query information about the at least one frequency and bandwidth combination is received from the network side, sending, to the network side, information that the first or second number of transmitting ports is supported for the at least one frequency and bandwidth combination.

6. A User Equipment (UE), comprising:

a processor;

a memory configured to store computer programs capable of running in the processor; and at least one network interface;

wherein the processor is configured to run the computer programs to determine whether performance degradation exists for a present frequency and bandwidth combination when the performance degradation exists for a present Band Combination (BC), to obtain a determination result; and determine to indicate a network side that the UE uses a first or second number of transmitting ports based on the determination result, wherein the first number is smaller than the second number, the present BC is for systems, and the present frequency and bandwidth combination is for cells, wherein the at least one network interface is configured to send an indication to the network side, and wherein the processor is further configured to run the computer programs to determine to indicate the network side that the UE uses the second number of transmitting ports when the determination result indicates that no performance degradation exists for the present frequency and bandwidth combination.

7. The UE of claim 6, wherein the at least one network interface is further configured to send a wireless capability to the network side after the UE enters a connected state.

8. The UE of claim 7, wherein the wireless capability comprises performance degradation indication information of the UE for at least one BC, each BC comprises at least two bands, and the performance degradation indication information indicates whether the performance degradation exists for the at least one BC.

9. The UE of claim 7, wherein the wireless capability comprises a number of transmitting ports used by the UE for each of at least one BC, each BC comprises at least two bands.

10. The UE of claim 7, wherein the processor is further configured to determine whether query information about at least one frequency and bandwidth combination is received from the network side after the wireless capability is sent to the network side and send, to the network side, information that the first or second number of transmitting ports is supported for the at least one frequency and bandwidth combination if the query information about the at least one frequency and bandwidth combination is received from the network side.

11. A network device, comprising:

a processor;

a memory configured to store computer programs capable of running in the processor; and at least one network interface;

wherein the processor is configured to run the computer programs to acquire an indication sent by a User Equipment (UE) when performance degradation exists for a present Band Combination (BC) and determine, according to the indication, that the UE uses a first or second number of transmitting ports, wherein the first number is smaller than the second number; and wherein the at least one network interface is configured to receive the indication sent by the UE, wherein the processor is further configured to run the computer programs to determine that no performance degradation exists for a present frequency and bandwidth combination corresponding to the UE when the indication received from the UE indicates that the UE uses the second number of transmitting ports, wherein the present BC is for systems, and the present frequency and bandwidth combination is for cells.

12. The network device of claim 11, wherein the processor is further configured to determine whether a wireless capability corresponding to the UE is stored on a Core Network (CN) side after the UE enters a connected state, and send request information for acquiring the wireless capability to the UE if no wireless capability corresponding to the UE is stored on the CN side.

13. The network device of claim 12, wherein the wireless capability comprises performance degradation indication information of the UE for at least one BC, each BC comprises at least two bands, and the performance degradation indication information indicates whether the performance degradation exists for the at least one BC.

14. The network device of claim 12, wherein the wireless capability comprises a number of transmitting ports used by the UE for each of at least one BC, and each BC comprises at least two bands.

15. The network device of claim 11, wherein the at least one network interface is further configured to acquire the indication sent by a Secondary Cell Group (SCG) via Xn when the UE sends the indication to a network side through the SCG.

16. The network device of claim 11, wherein the at least one network interface is further configured to receive hardware capability information sent by the UE, the hardware capability information indicates whether the UE supports the second number of transmitting ports.

17. The network device of claim 16, wherein the processor is further configured to perform resource configuration based on the first number of transmitting ports when an indication indicating that the first number of transmitting ports is used is received from the UE, and perform resource configuration based on the second number of transmitting ports when no indication indicating that the first number of transmitting ports is used is received from the UE.

18. The network device of claim 12, wherein the processor is configured to:

send query information about at least one frequency and bandwidth combination to the UE after the wireless capability is received from the UE; and receive from the UE information that the first or second number of transmitting ports is supported for the at least one frequency and bandwidth combination.

* * * * *